United States Patent Office 2,764,554
Patented Sept. 25, 1956

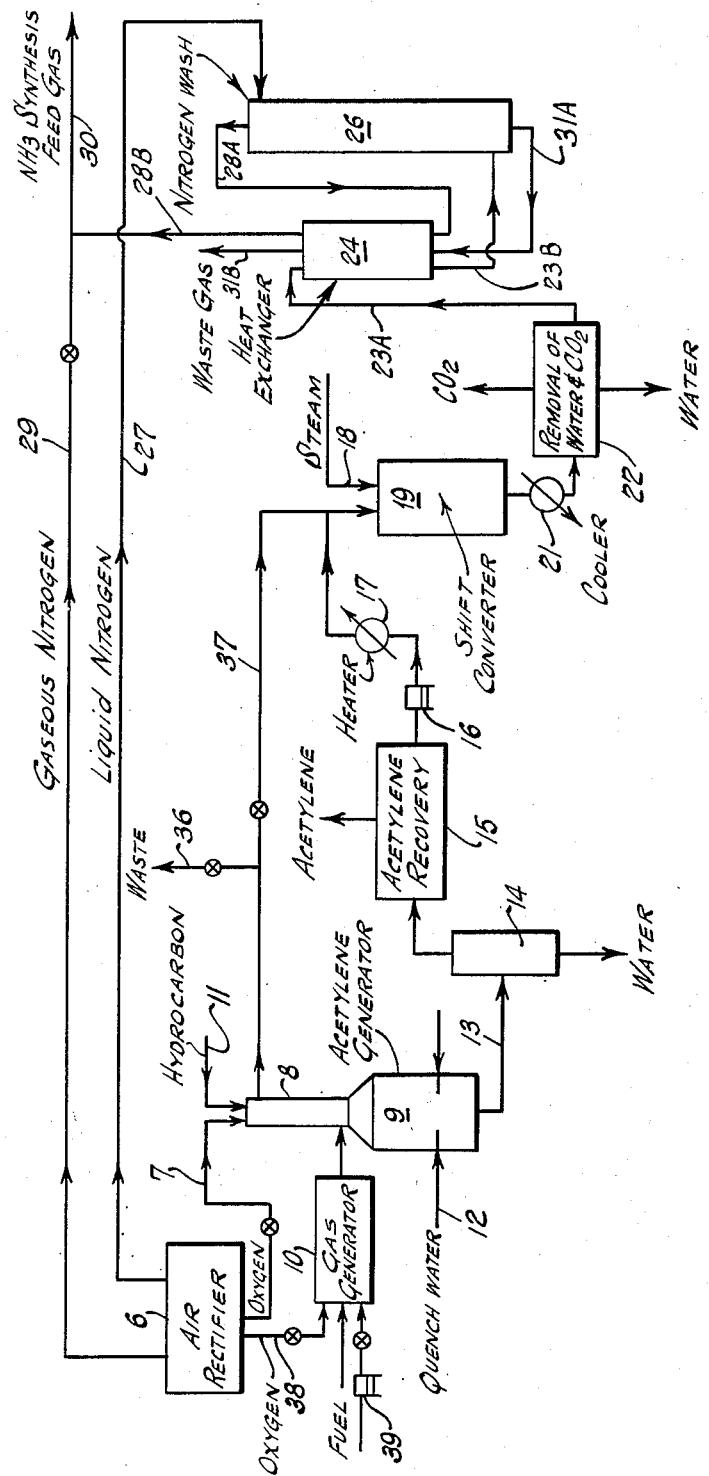

2,764,554

PROCESS FOR THE PRODUCTION OF A HYDROGEN-NITROGEN MIXTURE AND ACETYLENE

Frederick B. Sellers, Tarrytown, and Harry V. Rees, Chappaqua, N. Y., assignors to Texaco Development Corporation, New York, N. Y., a corporation of Delaware Application May 19, 1954, Serial No. 430,851

4 Claims. (Cl. 252—376)

This invention relates to a process for the production of acetylene and the simultaneous production of a mixture of high purity hydrogen and nitrogen in predetermined proportions. In one of its more specific aspects, this invention relates to an improved process for the production of acetylene by partial oxidation of a hydrocarbon and the simultaneous production of a mixture of hydrogen and nitrogen containing three parts hydrogen by volume per part of nitrogen.

Both acetylene and ammonia are commercially important chemicals. Acetylene may be produced by partial oxidation of a more saturated hydrocarbon. Hydrogen for the synthesis of ammonia may also be obtained by partial oxidation of a hydrocarbon. The advent of commercial oxygen production in tonnage quantities has made practical both the production of acetylene and the generation of ammonia synthesis feed gas by partial oxidation of hydrocarbons. Ordinarily, a plant produces one or the other, but not both simultaneously. The present invention provides an improved process by means of which acetylene and a mixture of hydrogen and nitrogen for the synthesis of ammonia are simultaneously produced. This novel process effects a savings both in fuel and operating costs and produces a nitrogen-hydrogen mixture of unusual purity.

Acetylene may be produced by reacting a hydrocarbon in gas phase with a limited amount of oxygen at a temperature in the range of from about 2,500° F. to about 3,500° F., and with a reaction time between 0.001 and 0.1 second. The quantity of oxygen relative to the quantity of hydrocarbon is suitably within the range of from 0.45 to about 0.65 mol of oxygen per atom of carbon in the hydrocarbon. The process is usually carried out at atmospheric pressure.

Quenching the reaction products is necessary to limit the reaction time and to minimize decomposition or other undesired reaction of the acetylene. The reaction may be quenched, or the reaction products "frozen," by substantially instantaneously cooling the reaction products to a temperature well below the reaction temperature, for example, to 800° F., or lower.

Preferably, substantially pure oxygen and a gasiform hydrocarbon are admixed with one another and the resulting mixture introduced into a reaction zone through a suitable flame barrier. The reaction zone contains no packing or catalyst and is so designed that the flow path of the reactants and resulting reaction products through the reactor is relatively short. The reaction products are quenched to limit the total reaction time to a period within the range of 0.001 to 0.1 second.

Normally liquid or normally gaseous hydrocarbons may be utilized in the process. Normally liquid hydrocarbons are vaporized, the vapors admixed with oxygen and passed into the reaction zone.

The hydrocarbon and oxygen may be preheated, separately or in admixture with one another, before introduction into the reaction zone. Preferably, the reactants are heated to a temperature in the range of 800 to 1,500° F. Commercially pure oxygen, e. g., oxygen obtained by rectification of air and containing in excess of 90 per cent oxygen by volume, is suitable for use in this process. Commercial oxygen often is available in a concentration in excess of 95 per cent oxygen by volume; such concentrations are preferred.

A process for the production of acetylene by partial combustion of a hydrocarbon with oxygen is disclosed in U. S. Patent No. 2,195,227.

In the synthesis of ammonia three volumes of hydrogen are required per volume of nitrogen. The hydrogen may be obtained by partial oxidation of a carbonaceous fuel. Nitrogen is abundantly available from the atmosphere.

Hydrocarbons are especially suited for the production of hydrogen by reaction with free oxygen or an oxygen-yielding compound. Partial oxidation of a hydrocarbon produces a mixture of carbon monoxide and hydrogen. The carbon monoxide may be reacted with steam to produce carbon dioxide and additional hydrogen. One volume of hydrogen is produced for each volume of carbon monoxide reacted. With the addition of nitrogen and the removal of carbon dioxide, water, residual hydrocarbon, residual carbon monoxide, and other impurities, a mixture of hydrogen and nitrogen suitable for the synthesis of ammonia may be obtained. Nitrogen may be obtained from the air either by rectification or by the use of air as a source of free oxygen in the partial oxidation reaction.

The reaction between a hydrocarbon and oxygen to produce carbon monoxide and hydrogen is preferably carried out in a compact reaction zone free from catalyst or packing and maintained at a temperature in the range of from about 2,200 to 3,200° F. The quantity of oxygen relative to the quantity of hydrocarbon is suitably within the range of from about 0.55 to about 0.75 mol of oxygen per atom of carbon in the hydrocarbon. A reaction time in the range of about 1 to 5 seconds is desirable, insuring complete consumption of the free oxygen. The process may be carried out at atmospheric pressure, but preferably is conducted at a pressure in the range of 100 to 1,000 pounds per square inch gauge. A small amount of hydrocarbon, usually in the range of 0.05 to 2 mol per cent, appears in the product gas stream.

The reaction of a hydrocarbon with free oxygen, for example, reaction of a hydrocarbon with air, oxygen-enriched air or substantially pure oxygen, is a highly exothermic reaction. Oxygen in combined form, particularly as steam or carbon dioxide, may also be used in conjunction with free oxygen to supply part of the oxygen for the reaction. The reaction of hydrocarbons with steam or carbon dioxide is endothermic. By balancing the supply of free oxygen and endothermic reactant, such as steam or carbon dioxide, the desired reaction temperature may be autogenously maintained. In general, when the hydrocarbon consists essentially of methane it is desirable to use little or no combined oxygen or endothermic reactant. With heavier hydrocarbons increased amounts of endothermic reactant may be used, particularly when the free oxygen is supplied in substantially pure form.

A preferred process for the generation of hydrogen and carbon monoxide by partial oxidation of a hydrocarbon is disclosed in U. S. Patent No. 2,582,938.

The ammonia synthesis reaction is conducted at a pressure of several thousand pounds per square inch, suitably 5,000 and higher, and an elevated temperature, suitably around 950° F., in the presence of a catalyst. A catalyst prepared from magnetic iron oxide promoted with the oxides of potassium and aluminum and subsequently reduced to metallic iron, is used commercially. In commercial operations, low conversion per pass is obtained, i. e., only a limited amount of the nitrogen-hydrogen mixture is converted to ammonia each time it passes over the catalyst. A conversion of 8 to 12 per cent per pass may be expected commercially. Unconverted nitrogen and hydrogen are recycled. It is evident that roughly 90 per cent of the feed to the converter represents recycled gas. To prevent the build-up of inert gases in the ammonia synthesis loop, it is desirable to supply a feed gas of high purity to the reactor.

According to the process of this invention, air is rectified into an oxygen-rich fraction containing in excess of 40 volume per cent, and preferably in excess of 95 volume per cent, oxygen and a nitrogen fraction of at least 99 per cent purity and preferably in excess of 99.5 per cent purity. The oxygen fraction contains substantially all of the argon from the air. The oxygen fraction is reacted with a hydrocarbon under conditions effective to produce acetylene. The product gas comprises hydrogen, carbon monoxide, acetylene, methane, and argon. After separation of the acetylene, the resulting gas mixture, termed "tail gas," is passed to a water gas shift reaction zone wherein the carbon monoxide is converted to carbon dioxide by reaction with steam with the concomitant production of hydrogen. The resulting gas stream is treated for the removal of carbon dioxide and water and then contacted with liquid nitrogen from the air rectification step whereupon the components of the gas stream other than hydrogen are condensed and substantially completely eliminated from the gas stream. Nitrogen is added to the hydrogen stream in the nitrogen wash step. A mixture of hydrogen and nitrogen of exceptional purity suitable for ammonia synthesis is obtained.

The process of our invention will be more readily understood with reference to the following detailed example and the accompanying drawings.

The drawing is a diagrammtic elevational view illustrating the process of our invention.

With reference to the drawing, air is separated in an air rectification plant 6 into an oxygen-rich fraction and a nitrogen fraction. In a specific example, the oxygen fraction contains approximately 95 per cent oxygen by volume and the nitrogen fraction, approximately 99.7 volume per cent nitrogen; nearly all of the argon from the air is contained in the oxygen fraction. Both liquid and gaseous nitrogen are available from the rectification plant. Oxygen from the rectification plant is passed through line 7 into a preheater 8 associated with an acetylene generator 9. A hydrocarbon, e. g., naturel gas, is introduced via line 11 into the preheater into admixture with the oxygen. The oxygen and natural gas are preheated, e. g., to a temperature of about 1,200° F., in the preheater 8 by indirect heat exchange with hot gases from a gas generator 10, described in greater detail hereinafter. The preheated gaseous mixture is discharged directly into the acetylene generator 9 where the hydrocarbon and oxygen react to produce acetylene, carbon monoxide, and hydrogen.

The acetylene generator comprises a compact, unpacked reaction zone. In this example, the acetylene generator is operated at a pressure of about 5 p. s. i. g. and at an average temperature of about 2,800° F. The gas is introduced into the reactor at a flow rate sufficient to produce an average inlet gas velocity in the range of about 10 to 30 feet per second. The reaction products are cooled almost instantaneously to a temperature below about 200° F. by intimately contacting the gaseous products with water introduced through lines 12. The reaction time is about 0.005 second.

The cooled gas stream containing steam and unvaporized water is discharged through an outlet conduit 13 into a water separator 14. The gas stream comprises hydrogen, carbon monoxide, acetylene, methane, carbon dioxide, and argon. The product gas stream from the acetylene generator passes to an acetylene recovery unit 15 wherein the acetylene is separated from the other components. A number of processes for the recovery of acetylene are known. In this particular example, acetylene is removed from the gas stream by contacting the gas stream with dimethyl formamide. The residual gas stream comprising carbon monoxide, hydrogen, argon, carbon dioxide and methane is raised to a pressure of about 100 p. s. i. g. by compressor 16, passed through heater 17 where it is heated to a temperature of about 700° F., mixed with 750° F. steam entering through line 18, and passed into shift converter 19.

In the shift converter 19, the carbon monoxide, which comprises about 28 per cent by volume of the effluent gas stream from the acetylene recovery unit, is almost completely converted to carbon dioxide by reaction with water vapor in the presence of an iron catalyst, at the same time forming an equivalent amount of hydrogen. The product gas from the shift converter is at a temperature of about 750° F. and contains about 2 per cent residual carbon monoxide on a dry, carbon dioxide-free basis.

The product gas stream from the shift converter is cooled in cooler 21 and subjected to treatment in purification unit 22 for removal of water and carbon dioxide. It will be evident that the effluent gas stream from the shift converter may be passed in heat exchange with the feed stream to the shift converter, although not illustrated in the drawing. As a specific example, the removal of water and carbon dioxide from the gas stream in purification unit 22 may be accomplished as follows. The gas stream is cooled in cooler 21 to a temperature on the order of 100° F. The resulting condensate is separated from the gas stream. The gas stream is then contacted with a solution of monoethanolamine which preferentially absorbs the carbon dioxide. Following the treatment with monoethanolamine for removal of carbon dioxide, the gas stream preferably is subjected to a caustic wash, i. e., to contact with a 10 per cent solution of sodium hydroxide, which also effects removal of carbon dioxide. The gas stream is then cooled to a temperature on the order of 40° F. to separate additional water by condensation. The partially dried gas stream is then subjected to chemical dehydration, for example, by passing the gas over a desiccant, such as bauxite, alumina, or silica gel.

The dry gas stream from the purification unit 22 consists principally of hydrogen but still contains small amounts of carbon monoxide, methane, argon, traces of water vapor and carbon dioxide. The dry gas stream is passed through line 23A through heat exchanger 24 and then through line 23B into nitrogen wash tower 26. In heat exchanger 24, the gas stream is cooled to a temperature sufficiently low to condense the argon, in this example, to a temperature of about −315° F.

In the nitrogen wash tower 26, the gas stream is countercurrently contacted with liquid nitrogen from air rectification plant 6 which is introduced to the top of the nitrogen wash tower by way of line 27. The nitrogen wash tower is provided with trays to insure intimate countercurrent contact between the liquid nitrogen and the gas stream. Liquid nitrogen flowing downwardly through the tower condenses argon, carbon monoxide and methane from the hydrogen stream. At the same time part of the nitrogen is vaporized into the hydrogen. The gas leaving the top of the tower is substantially completely free from components other than hydrogen and nitrogen. In this example, a purified gas stream consisting of a mixture of hydrogen and nitrogen containing less than 10 parts per million of argon and less than 1 part per million of carbon monoxide is obtained overhead of the nitrogen wash tower.

The cold purified gas stream leaving the nitrogen wash tower passes through line 28A to heat exchanger 24 where it is passed in heat exchange with the incoming gas stream from line 23A. Following the heat exchange, the purified gas stream is discharged through line 28B. Additional nitrogen may be supplied, as required, from the air rectification plant 6 via line 29 to produce an ammonia synthesis feed gas containing three parts hydrogen and one part nitrogen by volume. The ammonia synthesis feed gas is delivered through line 30 to ammonia synthesis reactors, not illustrated.

From the bottom of the nitrogen wash tower 26, a liquid mixture of methane, carbon monoxide, argon, and nitrogen is passed through line 31A to heat exchanger 24 where it passes in heat exchange with the incoming gas stream from line 23. The stream from line 31A is vaporized and warmed in heat exchanger 24 and discharged through line 31B as a waste gas stream which may be used as fuel.

In the heat exchanger 24, the final traces of water and carbon dioxide are condensed from the gas stream entering the heat exchanger through line 23A and deposited as solids on the surfaces of the heat exchanger elements. To prevent the built-up of these deposits to the point where the efficiency of the heat exchanger is seriously impaired, a reversing type heat exchanger, well known in the art of air rectification, is preferably employed. In the reversing heat exchanger, provision is made for periodically interchanging the passages provided for the incoming gas stream from line 23A and the outgoing waste gas leaving the heat exchanger through line 31B. Gas from line 23A flows in one direction through one of the passages in the heat exchanger during the first half of the cycle, then, after reversal of the gas streams, the waste gas flows through the same passage in the opposite direction. The waste gas thus serves as a scavenger for removal of solid deposits from the heat exchanger. Other gases may be used for flushing the heat exchanger elements; nitrogen, for example, available from air rectifier 6 is a suitable flushing gas.

As previously mentioned, heat is supplied to preheater 8 by means of hot gases from a gas generator 10. The gas generator may be operated to produce flue gases which, after serving to preheat the hydrocarbon and oxygen feed to the acetylene generator, may be discharged through line 36. Alternatively, gas generator 34 may comprise a synthesis gas generator, e. g., as disclosed in U. S. Patent No. 2,582,938 and may be operated to produce a supplemental stream of carbon monoxide and hydrogen which serves as a source of additional hydrogen for the production of synthesis gas. In this case, the gas stream from generator 10, after passing through heat exchanger 8, is passed through line 37 to the shift converter 19. The heat contained in the gas stream from line 37 may supply part or all of the heat required to reheat the effluent gases from the acetylene recovery unit 11 and may eliminate the need for heater 17.

For the production of carbon monoxide and hydrogen in gas generator 10, it is preferable to employ a hydrocarbon as fuel for the gas generator. Either air or oxygen may be supplied to the gas generator. Oxygen may be obtained from air rectifier 6 through line 38; air, from compressor 39. Alternatively, air, supplemented with oxygen, may be supplied to the gas generator. By adjusting the relative proportions of air and oxygen supplied to the gas generator 10 a gaseous product may be produced which, when combined with the tail gases from the acetylene recovery unit, passed through shift converter 19, purification unit 22, and nitrogen wash tower 26, yields a mixture of nitrogen and hydrogen in the proper proportions for ammonia synthesis feed gas.

The following additional examples illustrate this invention.

EXAMPLE 1

Natural gas of the following composition is used as feed to an acetylene generator:

*Hydrocarbon feed*

| Component: | Mol per cent |
|---|---|
| Methane | 93.1 |
| Ethane | 4.2 |
| Propane | 1.5 |
| C$_4$'s and higher hydrocarbons | 0.4 |
| Carbon dioxide | 0.6 |
| Nitrogen | 0.2 |

Oxygen of 97 per cent purity, obtained by air rectification and containing argon from the air, is supplied to the acetylene generator for reaction with the natural gas. The feed to the acetylene generator consists of 24,000 s. c. f. h. (standard cubic feet per hour) of natural gas and 14,415 s. c. f. h. of oxygen-containing gas; both preheated to 1,300° F. The acetylene generator operates at 2,800° F. and 5 p. s. i. g. The reaction products are rapidly quenched with water to 180° F. to produce 47,732 s. c. f. h. of dry product gas which has the following composition (on a dry basis):

*Acetylene generator product*

| Component: | Mol per cent |
|---|---|
| Hydrogen | 56.2 |
| Carbon monoxide | 24.7 |
| Acetylene | 9.5 |
| Higher acetylenes | 0.4 |
| Methane and higher hydrocarbons | 5.0 |
| Carbon dioxide | 2.9 |
| Oxygen, nitrogen and argon | 1.3 |

This gas is directed to an acetylene recovery unit where the acetylene, higher acetylenes and higher hydrocarbons are removed by absorption in dimethylformamide. 42,022 s. c. f. h. of "tail gas" of the following composition (on a dry basis) are obtained:

*Acetylene tail gas*

| Component: | Mol per cent |
|---|---|
| Hydrogen | 62.7 |
| Carbon monoxide | 27.6 |
| Carbon dioxide | 3.1 |
| Methane | 5.5 |
| Nitrogen and argon | 1.1 |

The acetylene tail gas is then heated to about 750° F. and passed into a shift converter along with sufficient steam to convert substantially all of the carbon monoxide to carbon dioxide with the production of an equivalent amount of hydrogen. The product gas from the shift converter is cooled and directed to a purification unit for removal of the carbon dioxide by absorption in monoethanolamine, followed by a caustic wash. The resulting gas stream amounts to 40,719 s. c. f. h. and has the following composition on a dry basis:

*Gas to nitrogen wash*

| Component: | Mol per cent |
|---|---|
| Hydrogen | 91.7 |
| Methane | 5.7 |
| Carbon monoxide | 1.4 |
| Nitrogen and argon | 1.2 |

This gas stream is then directed to a liquid nitrogen wash unit where the residual methane and carbon monoxide are removed by liquefaction by contact with liquid nitrogen of 99.7 per cent purity obtained from the air rectification step to produce a mixture of nitrogen and hydrogen substantially free from other constituents. Gaseous nitrogen of 99.7 per cent purity from the air rectification step is added to the hydrogen to produce an ammonia synthesis gas stream. The gas directed to ammonia synthesis amounts to 49,405 s. c. h. f. and has the following composition:

*Ammonia synthesis feed gas*

| Component: | Mol per cent |
| --- | --- |
| Hydrogen | 75.0 |
| Nitrogen | 25.0 |

(Impurities less than 60 parts per million)

EXAMPLE 2

As in Example 1, 24,000 s. c. f. h. of natural gas and 14,415 s. c. f. h. of oxygen are reacted in an acetylene generator under the same conditions as in Example 1, producing 47,732 s. c. f. h. of an acetylene bearing stream. The acetylene is recovered from this stream by absorption in dimethylformamide, producing 42,022 s. c. f. h. of "acetylene tail gas" comprising primarily hydrogen and carbon monoxide and having the composition shown in Example 1.

Concurrently 18,000 s. c. f. h. of natural gas of the same composition and 12,025 s. c. f. h. of 97 per cent purity oxygen are preheated to temperatures of 915° F. and 295° F. respectively, and directed to a synthesis gas generator. Partial combustion occurs in the generator at about 2,600° F. and 340 p. s. i. g. to produce 50,889 s. c. f. h. of raw synthesis gas having the following composition on a dry basis:

*Raw synthesis gas*

| Component: | Mol per cent |
| --- | --- |
| Carbon monoxide | 36.0 |
| Hydrogen | 59.8 |
| Carbon dioxide | 2.0 |
| Methane | 0.2 |
| Nitrogen and argon | 2.0 |

The raw synthesis gas is cooled to about 450° F. by indirect heat exchange with the gas and oxygen charge stream to the acetylene generation unit.

The tail gas from the acetylene recovery unit is compressed to 340 p. s. i. g. and combined with the raw synthesis gas producing a total gas stream of 92,911 s. c. f. h. having the following composition on a dry basis:

*Feed to shift converter*

| Component: | Mol per cent |
| --- | --- |
| Hydrogen | 61.1 |
| Carbon monoxide | 32.2 |
| Carbon dioxide | 2.5 |
| Methane | 2.6 |
| Nitrogen and argon | 1.6 |

This gas mixture is passed at 700° F. to a shift converter with sufficient steam at 750° F. to convert substantially all of the carbon monoxide to carbon dioxide with the production of an equivalent amount of hydrogen. The product gas from the shift converter is cooled and directed to a purification unit (as in Example 1) for removal of the carbon dioxide. The resulting gas stream amounts to 90,588 s. c. f. h. and has the following composition on a dry basis:

*Feed to nitrogen wash*

| Component: | Mol per cent |
| --- | --- |
| Hydrogen | 94.1 |
| Methane | 2.7 |
| Carbon monoxide | 1.6 |
| Nitrogen and argon | 1.6 |

This gas stream is then directed to a liquid nitrogen wash unit where the residual methane and carbon monoxide are removed by liquefaction, as in Example 1, to produce a mixture of nitrogen and hydrogen substantially completely free from other constituents. Nitrogen is added to produce an ammonia synthesis feed gas stream. The gas directed to ammonia synthesis amounts to 112,933 s. c. f. h. and has the following composition:

*Ammonia synthesis feed gas*

| Component: | Mol per cent |
| --- | --- |
| Hydrogen | 75.0 |
| Nitrogen | 25.0 |

(Impurities less than 60 parts per million)

Obviously, many modifications and variations of the invention, as hereinbefore set forth, may be made without departing from the spirit and scope thereof, and therefore only such limitations should be imposed as are indicated in the appended claims.

We claim:

1. A process for the production of a mixture of nitrogen and hydrogen and the simultaneous production of acetylene which comprises subjecting air to liquefaction and rectification producing an oxygen-rich fraction containing argon and a nitrogen fraction substantially free from oxygen and argon; reacting, for 0.001–0.1 second at 2500–3500° F. and substantially atmospheric pressure in an acetylene generation zone, a gasiform hydrocarbon with said oxygen-rich fraction in the ratio of 0.45–0.65 mols of oxygen per carbon atom in said hydrocarbon, thereby producing a product gas stream comprising a substantial quantity of acetylene in association with carbon monoxide, hydrogen, argon and methane; removing acetylene from said product gas stream by solvent absorption to leave a residue gas stream consisting essentially of methane, argon, carbon monoxide and hydrogen; converting said carbon monoxide in said residue gas stream to carbon dioxide with concomitant production of hydrogen by reaction with steam in a water gas shift reaction zone; separating carbon dioxide and water vapor from the resulting effluent of said water gas shift reaction zone; cooling the resulting gas stream comprising hydrogen and containing minor amounts of methane, argon, and unconverted carbon monoxide to temperature sufficiently low to condense argon therein; removing residual carbon monoxide, methane and argon from the cooled resulting stream by contacting it with said nitrogen-rich fraction in liquid phase and concomitantly vaporizing a portion of said nitrogen in an amount for obtaining a gaseous mixture of not substantially more than one volume part of nitrogen per three volume parts of hydrogen; and separating said gaseous mixture of nitrogen and hydrogen substantially completely free from other constituents.

2. The process as defined in claim 1 wherein additional hydrocarbon is reacted in a compact, unpacked synthesis gas generation zone for 1.5 seconds at 2200–3200° F. and pressure at about atmospheric to about 1000 p. s. i. g. with an oxygen-containing gas in the ratio of 0.55–0.75 mol of oxygen per atom of carbon in the hydrocarbon fed to said synthesis gas generation zone, thereby producing hot raw synthesis gas containing additional carbon monoxide and hydrogen substantially free from hydrocarbons; said hot raw synthesis is used for pre-heating the acetylene-generating reactants; and thereafter the raw synthesis gas is admixed with the effluent from the acetylene recovery step.

3. The process as defined in claim 2 wherein said oxygen-containing gas supplied to said synthesis gas generation zone comprises air.

4. The process as defined in claim 2 wherein said oxygen-containing gas supplied to said synthesis gas generation zone contains at least 95% by volume molecular oxygen made by air rectification and substantially all of the argon from the air so rectified.

References Cited in the file of this patent

UNITED STATES PATENTS

| | | |
|---|---|---|
| 1,716,813 | Casale | June 11, 1929 |
| 1,957,744 | Wietzel et al. | May 8, 1934 |
| 2,679,540 | Berg | May 25, 1954 |
| 2,679,541 | Berg | May 25, 1954 |

FOREIGN PATENTS

| | | |
|---|---|---|
| 231,218 | Great Britain | Mar. 26, 1925 |